UNITED STATES PATENT OFFICE.

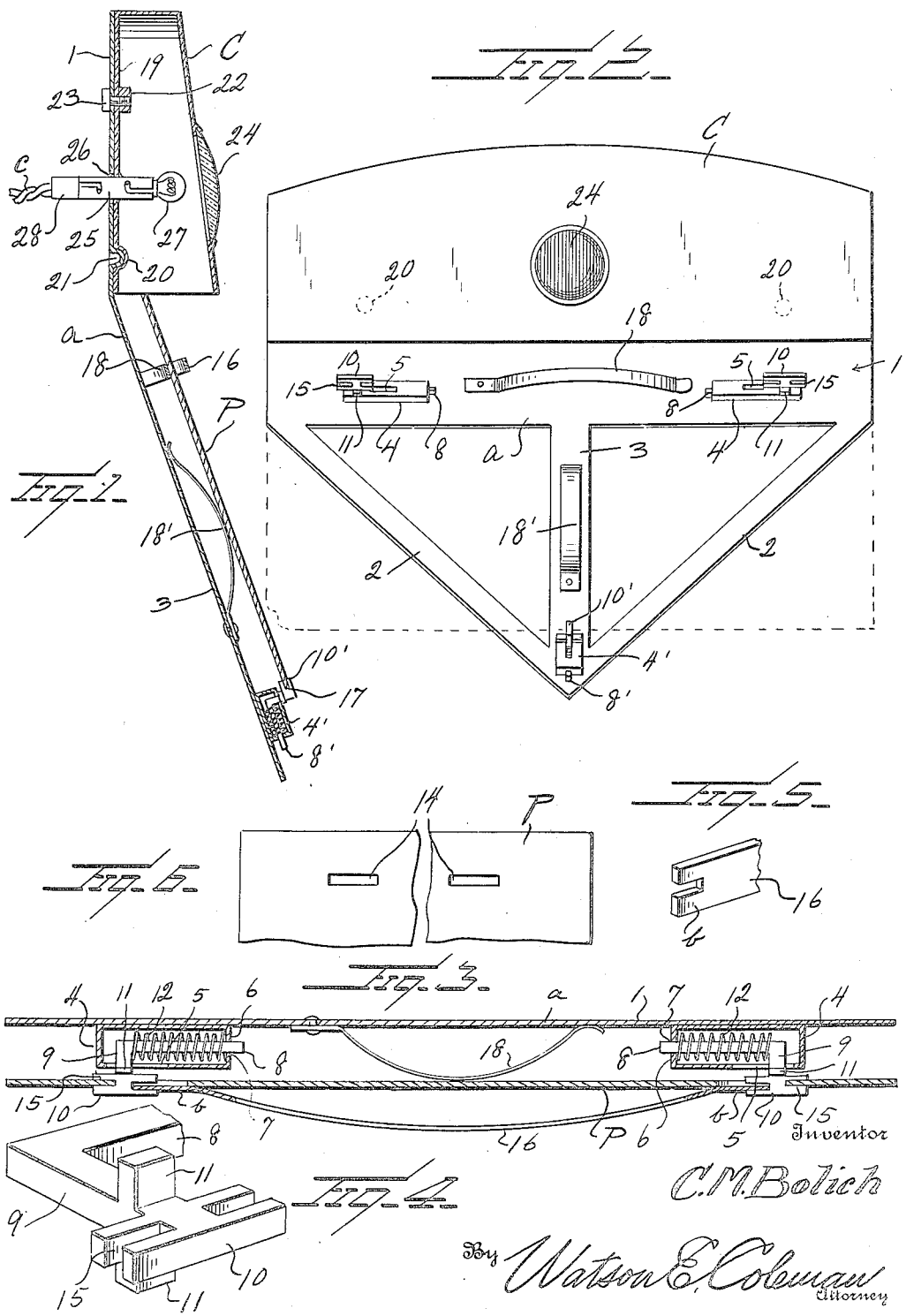

CHARLES M. BOLICH, OF ALLENTOWN, PENNSYLVANIA.

HOLDER FOR LICENSE-PLATES.

1,384,229.  Specification of Letters Patent.  Patented July 12, 1921.

Application filed April 2, 1921. Serial No. 457,945.

*To all whom it may concern:*

Be it known that I, CHARLES M. BOLICH, a citizen of the United States, residing at Allentown, in the county of Lehigh and State of Pennsylvania, have invented certain new and useful Improvements in Holders for License-Plates, of which the following is a specification, reference being had to the accompanying drawings.

This invention relates to a holder for the license plate of an automobile or the like, and it is an object of the invention to provide a device of this general character having novel and improved means whereby the license plate may be effectively held in applied position and in a manner whereby rattling is prevented.

Another object of the invention is to provide a novel and improved holder of this general character which may also be employed as a tail light and wherein the lamp is positioned to effectively illuminate the license.

An additional object of the invention is to provide a novel and improved holder of this general character embodying a plurality of brackets adapted to have gripping action upon the license plate and which brackets are constantly urged in one direction to maintain the desired engagement thereof with the license plate and wherein means are provided for holding said brackets against undue movement in the opposite direction.

The invention consists in the details of construction and in the combination and arrangement of the several parts of my improved holder for license plates whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a vertical sectional view taken through the central portion of a holder constructed in accordance with an embodiment of my invention, a license plate being applied;

Fig. 2 is a view in front elevation of the device as herein disclosed with the license plate indicated by dotted lines;

Fig. 3 is a horizontal sectional view taken through the device as herein set forth;

Fig. 4 is a fragmentary view in perspective on one of the clamping members as herein embodied;

Fig. 5 is a view in perspective of an extremity of the holding member herein disclosed; and Fig. 6 is a fragmentary view in elevation of the license plate disclosing the slots in the upper corners thereof.

As disclosed in the accompanying drawings, 1 denotes a plate preferably oblong in form and which has its longitudinal axis substantially horizontally disposed when the device is in applied position. Depending from the lower marginal portions of the plate 1 at the opposite extremities thereof are the converging arms or strips 2, the lower ends of which are connected and preferably integral. The connected portions of the arms 2 and the central part of the lower margin of the plate 1 are connected by the arm or strip 3.

The arms 2 and 3 are substantially coplanar and are disposed on an outward and downward incline with respect to the plate 1 or more particularly the outer face thereof. The license plate P, when applied, overlies the arms 2 and 3 and is maintained vertically on a slight incline in accordance with the outward and downward inclination of the arms 2 and 3 for a purpose to be hereinafter more particularly referred to. The lower marginal portion $a$ of the plate 1 is also outwardly and downwardly inclined and is coplanar with the arms 2 and 3, the upper marginal portion of the applied license plate overlying said inclined lower marginal portion $a$. The lower portion $a$ of the plate 1 adjacent the opposite ends thereof is provided with the longitudinally directed casings 4 and each of said casings is provided in its outer wall or face with the longitudinally directed slot 5. The inner end of each of said casings 4 is provided with a head 6 having an opening 7 in its central portion angular in cross section.

Mounted for endwise movement within each of the casings 4 is an elongated member 8 angular in cross section and which has one end portion movable through the opening 7. The opposite end portion of the elongated member 8 is provided with an outstanding lateral extension 9 passing through the slot 5. This extension 9 terminates exteriorly of the casing 4 and said extended portion is provided with a cross head 10 disposed in the same general direction as the elongated member 8. Said extension 9 inwardly of the head 10 is provided with the oppositely directed lugs 11 disposed at right angles to the head 10 and which lugs contact with the outer face of the casing 4 whereby the member 8 is effectively maintained in applied position and in a manner to permit said elongated member to have desired endwise movement.

Arranged within the casing 4 and encircling the member 8 is a coil spring 12, one end of which bears against the head 6 and the opposite end bears against the extension 9 so that the elongated member 8 is constantly urged in one direction. Each of the cross heads 10 is of a length less than the conventional slot 14 produced in a corner portion of the plate P so that said head 10 may be positioned within the slot. The opposite end portions of the head 10 are bifurcated and the kerf 15 of the outer bifurcation is adapted to receive the portion of the plate P adjacent the outer end of the slot 14 and which assembly is assured by the outward movement of the member 8 under the influence of the coil spring 12.

After the cross heads 10 have been properly engaged with the upper corners of the applied plate P, an elongated member 16 is interposed between said cross heads to hold the members 8 against retrograde or inward movement so that the applied license plate is held in position without rattling. The member 16 is preferably arcuate in form with its extremities *b* terminating in the straight portions which engage within the kerfs of the inner bifurcations of the heads 10.

Carried by the meeting end portions of the arms 2 is a vertically disposed casing 4' similar in construction to the casings 4. Coacting with the casing 4' in the same manner as has been hereinbefore set forth with respect to the member 8 is an elongated member 8' provided with exterior cross head 10' which is adapted to be arranged within a slot 17 positioned at the central part of the lower marginal portion of the plate P and whereby the lower marginal portion of said plate P is effectively clamped to further maintain said plate in position.

To further prevent rattling of the applied plate P, I find it of advantage to secure to the portion *a* of the plate 1 centrally of the casings 4 an arcuate spring arm 18 having one extremity secured to the portion *a* of the plate 1 and the opposite extremity free. This spring is placed under tension when the plate P is applied. I also find it of advantage to arrange at the central part of the arm 3 a spring member 18' similar to the spring 18 and operating for the same purpose.

C denotes an elongated casing substantially coextensive in length with the length of the plate 1 and which has its lower face open. The rear wall 19 of the casing C is provided at longitudinally spaced points with the depressions or pockets 20 preferably pressed therein which are adapted to snugly receive the protuberances 21 pressed or otherwise formed on the plate 1. The upper portion of said rear wall 19 is provided at its central portion with a reinforced threaded opening 22 adapted to receive the clamping bolt 23 disposed through the plate 1. The bolt 23 and the coacting depressions or sockets 20 and protuberances 21 provide means to effectively maintain the casing C in applied position upon the plate 1. The bolt 23 is readily removable so that said casing can be applied or removed in accordance with the requirements of practice.

The outer wall of the casing C at its central portion is provided with a bull's-eye 24, said bull's-eye being preferably red, so that when my improved holder is in applied position it can also be employed with equal facility as a tail light.

Disposed through and permanently secured to the rear wall 19 of the casing C is a double socket 25, the plate 1 being provided with an opening 26 through which the rear end portion of said socket may pass when the casing C is applied. A bulb 27 is detachably engaged within the forward end portion of the socket 25 so that when said bulb is lighted, the applied license plate will be effectively illuminated and at the same time the rays emitted from said light will be transmitted through the bull's-eye 24 so that my complete device effectively serves as a tail or rear danger light.

A plug 28 is detachably engaged with the rear portion of the socket 25, said plug being operatively engaged with the conductors *c* leading from a suitable source of electrical energy.

The casing C may also be employed as a trouble finder and when so used the plug 28 is disengaged from the socket 25 and the casing C detached from the plate 1. An extension cord of a conventional type is then coupled to the plug 28 and with the socket 25. This permits the casing C to be readily manipulated as required to locate any trouble about the automobile or other vehicle.

The interior faces of the casing C have applied thereto a coating of enamel or other reflective material so that the rays emitted from the lamp will be effectively directed upon the applied license plate P.

When my holder is employed in connection with a front license plate, the casing C and the light are omitted.

It is also to be understood that my improved holder is adapted to be secured to the vehicle in any manner which best meets the requirements of practice but as this in itself forms no particular part of my invention, it is thought that a description and illustration of this fastening means are unnecessary.

From the foregoing description it is thought to be obvious that a license plate for an automobile or the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, and means for constantly urging the slidable member in a direction to maintain the head in contact with the portion of the plate defining the aforesaid end of the slot.

2. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and means for holding each of the slidable members normally against return movement.

3. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and a member coacting with a pair of slidable members for holding the same against retrograde movement.

4. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, the head of each of the members being provided with a second bifurcation, and an elongated member interposed between said slidable members and having an end portion seating in the second bifurcation of each of the heads for holding the slidable members against retrograde movement.

5. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and a spring member carried by the first named member for coaction with the plate.

6. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and means carried by the first named member and coacting with the plate to hold the plate against rattling.

7. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and means carried by the first named member above the plate for directing rays of light upon the plate.

8. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, a casing detachably engaged with the first named member above the plate, the lower portion of the casing being open, and an illuminating member arranged within the casing.

9. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, a casing detachably engaged with the first named member above the plate, the lower portion of the casing being open, and an illuminating member arranged within the casing, the portion of the first named member below the casing being inclined in a direction inwardly of the casing.

10. A device of the class described comprising, in combination, a plate having a marginal portion inclined, converging arms depending from the opposite extremities of the inclined portions of the plate, the lower ends of said arms being connected, clamping members carried by the opposite extremities of the inclined portion of the plate, the lower extremities of the arms being connected, clamping members carried by the inclined portion of the plate at spaced points, a clamping member carried by the connected end portions of the arms, and a second plate overlying the inclined portion of the first named plate and the arm and with which the clamping members engage to hold the second named plate in applied position.

11. A device of the character described comprising, in combination, a member, a plate overlying said member, said plate being provided with slots, slidable members carried by the first named member, each of said slidable members having a head adapted to be positioned within a slot of the plate, an end portion of the head being bifurcated to straddle the portion of the plate defining an end of a slot, means for constantly urging the slidable member in a direction to maintain the head in contact with the portion of the plate defining the aforesaid end of the slot, and a yieldable medium interposed between the first named member and the plate for holding the plate against rattling.

12. A device of the character described comprising, in combination, a member, a plate partially overlying said member, clamping means carried by the member and coacting with the plate for holding said plate in applied position, and a bow spring having one end portion secured to the member, the intermediate portion of the spring contacting with the plate to hold the same against rattling.

13. A device of the class described comprising, in combination, a member, a plate overlying said member, said plate being provided with slots, slidable members carried by the first named member, each of said slidable members extending within the slot of the plate, and means for constantly urging the slidable member in a direction to engage the portion of the plate defining an end of the slot.

In testimony whereof I hereunto affix my signature.

CHARLES M. BOLICH.